US009672587B2

(12) United States Patent
Breedvelt-Schouten et al.

(10) Patent No.: US 9,672,587 B2
(45) Date of Patent: Jun. 6, 2017

(54) RIGID CURVED WEARABLE DISPLAY DEVICE

(71) Applicant: INTERNATIONAL BUSINESS MACHINES CORPORATION, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US); James L. Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/568,601

(22) Filed: Dec. 12, 2014

(65) Prior Publication Data

US 2016/0171646 A1    Jun. 16, 2016

(51) Int. Cl.
*G06F 1/16*     (2006.01)
*G06F 3/0481*   (2013.01)
*G06T 3/00*     (2006.01)
*G06F 3/01*     (2006.01)
*G06F 3/0346*   (2013.01)

(52) U.S. Cl.
CPC .............. *G06T 3/005* (2013.01); *G06F 1/163* (2013.01); *G06F 3/014* (2013.01); *G06F 3/015* (2013.01); *G06F 3/0346* (2013.01); *G06F 2200/1637* (2013.01)

(58) Field of Classification Search
USPC ....................................................... 345/647
See application file for complete search history.

(56) References Cited

U.S. PATENT DOCUMENTS 5,931,764 A     8/1999  Freeman et al.
8,279,170 B2   10/2012  Sugahara
2004/0233275 A1* 11/2004 Tomita ............... G02B 27/0093
                                                    348/51

(Continued)

OTHER PUBLICATIONS

U.S. Appl. No. 14/297,091 Non-Final Office Action Mailed Mar. 3, 2016.

(Continued)

*Primary Examiner* — Gregory J Tryder
*Assistant Examiner* — Yi Yang
(74) *Attorney, Agent, or Firm* — Law Office of Jim Boice (57) ABSTRACT

An image is modified for display on a rigid curved wearable display device. Positioning data is received from position sensors on the rigid curved wearable display device. The position sensors provide positioning data that describe, in real time, a physical three-dimensional orientation of the rigid curved wearable display device relative to a field of vision of a wearer of the rigid curved wearable display device. The position sensors further determine a present viewable area of the exterior display surface based on the physical three-dimensional orientation of the rigid curved wearable display device relative to the field of vision of the wearer. An image on the present viewable area is modified based on the physical three-dimensional orientation of the rigid curved wearable display device relative to the field of vision of the wearer, thus generating a modified image that is displayed on a predefined area of the exterior display surface.

11 Claims, 6 Drawing Sheets

(56) References Cited

U.S. PATENT DOCUMENTS

| | | | |
|---|---|---|---|
| 2007/0106172 A1* | 5/2007 | Abreu | A61B 5/0002 600/549 |
| 2008/0174451 A1* | 7/2008 | Harrington | G08B 21/06 340/905 |
| 2012/0092363 A1* | 4/2012 | Kim | G06T 5/006 345/618 |
| 2012/0235893 A1 | 9/2012 | Phillips et al. | |
| 2012/0236107 A1 | 9/2012 | Rosenberg | |
| 2013/0076612 A1 | 3/2013 | Myers | |
| 2013/0222270 A1* | 8/2013 | Winkler | H04M 1/0233 345/173 |
| 2013/0262298 A1* | 10/2013 | Morley | H04M 1/05 705/39 |

OTHER PUBLICATIONS

K. Moskvitch, "Bend Me, Shape Me: Flexible Phones 'Out by 2013'", BBC News, Technology, Nov. 29, 2012, pp. 104.

S. Tabbitt, "CES 2013: Papertab Tablet Boasts Flexible Display", UBM, LLC, INFORMATIONWEEK, informationweek.com, Jan. 8, 2013, pp. 1-6.

Anonymous, "Flexible Displays Are the Future—Papertab Head Reveals His Vision", Haymarket Media Group, stuff.tv, Jan. 21, 2013, pp. 1-6.

S. R. Epps, "Wearable Devices' Next Design Challenge: The Human Brain", Say Media Inc., readwrite.com, Feb. 4, 2013, pp. 1-5.

L. Eadicicco, "Watch Out! The World's Thinnest Wristwatch Launches on Kickstarter", DESIGNTECHNICA Corporation, digitaltrends.com, Jan. 17, 2013, pp. 1-4.

Anonymous, "Flex Sensor 4.5''", Sparkfun Electronics, sparkfun.com, Retrieved Dec. 12, 2014, pp. 1-6.

Anonymous, "Two-Directional Bi-Flex Sensors TM", Images SI, Inc., imagesco.com, Retrieved Dec. 12, 2014, pp. 1-4.

Anonymous, "Flexible Display", Wikimedia Foundation, Inc, wikipedia.org, Retrieved Dec. 12, 2014, Last Modified Oct. 29, 2014, pp. 1-7.

List of IBM Patent and Patent Applications Treated as Related, Dec. 12, 2014.

Anonymous, "Anamorphic Widescreen", Wikimedia Foundation, Inc., wikipedia.org, Retrieved Dec. 12, 2014, Last Modified Sep. 22, 2014, pp. 1-6.

U.S. Appl. No. 14/297,091 Final Office Action Mailed Oct. 18, 2016.

* cited by examiner

RIGID CURVED WEARABLE DISPLAY DEVICE

BACKGROUND

The present disclosure relates to the field of electronic devices, and specifically to output display devices used with computers. Still more specifically, the present invention relates to rigid curved wearable display devices.

SUMMARY

In an embodiment of the present invention, a method and/or computer program product displays an image on the rigid curved wearable display device. Positioning data is received from position sensors on a rigid curved wearable display device. The position sensors provide positioning data that describe, in real time, a physical three-dimensional orientation of the rigid curved wearable display device relative to a field of vision of a wearer of the rigid curved wearable display device. The rigid curved wearable display device has an exterior display surface, which has a convex planar shape. The position sensors determine a present viewable area of the exterior display surface based on the physical three-dimensional orientation of the rigid curved wearable display device relative to the field of vision of the wearer of the rigid curved wearable display device. An image on the present viewable area is modified based on the physical three-dimensional orientation of the rigid curved wearable display device relative to the field of vision of the wearer of the rigid curved wearable display device, thus generating a modified image that is displayed on a predefined area of the exterior display surface.

In an embodiment of the present invention, a rigid curved wearable display device comprises a set of position sensors, one or more processors, and a video display controller. The set of position sensors provide positioning data that describe, in real time, a physical three-dimensional orientation of the rigid curved wearable display device relative to a field of vision of a wearer of the rigid curved wearable display device. The rigid curved wearable display device has an exterior display surface, which has a convex planar shape. The position sensors determine a present viewable area of the exterior display surface based on the physical three-dimensional orientation of the rigid curved wearable display device relative to the field of vision of the wearer of the rigid curved wearable display device. One or more processors modify an image on the present viewable area based on the physical three-dimensional orientation of the rigid curved wearable display device relative to the field of vision of the wearer of the rigid curved wearable display device, thus generating a modified image. A video display controller displays the modified image on a predefined area of the exterior display surface.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
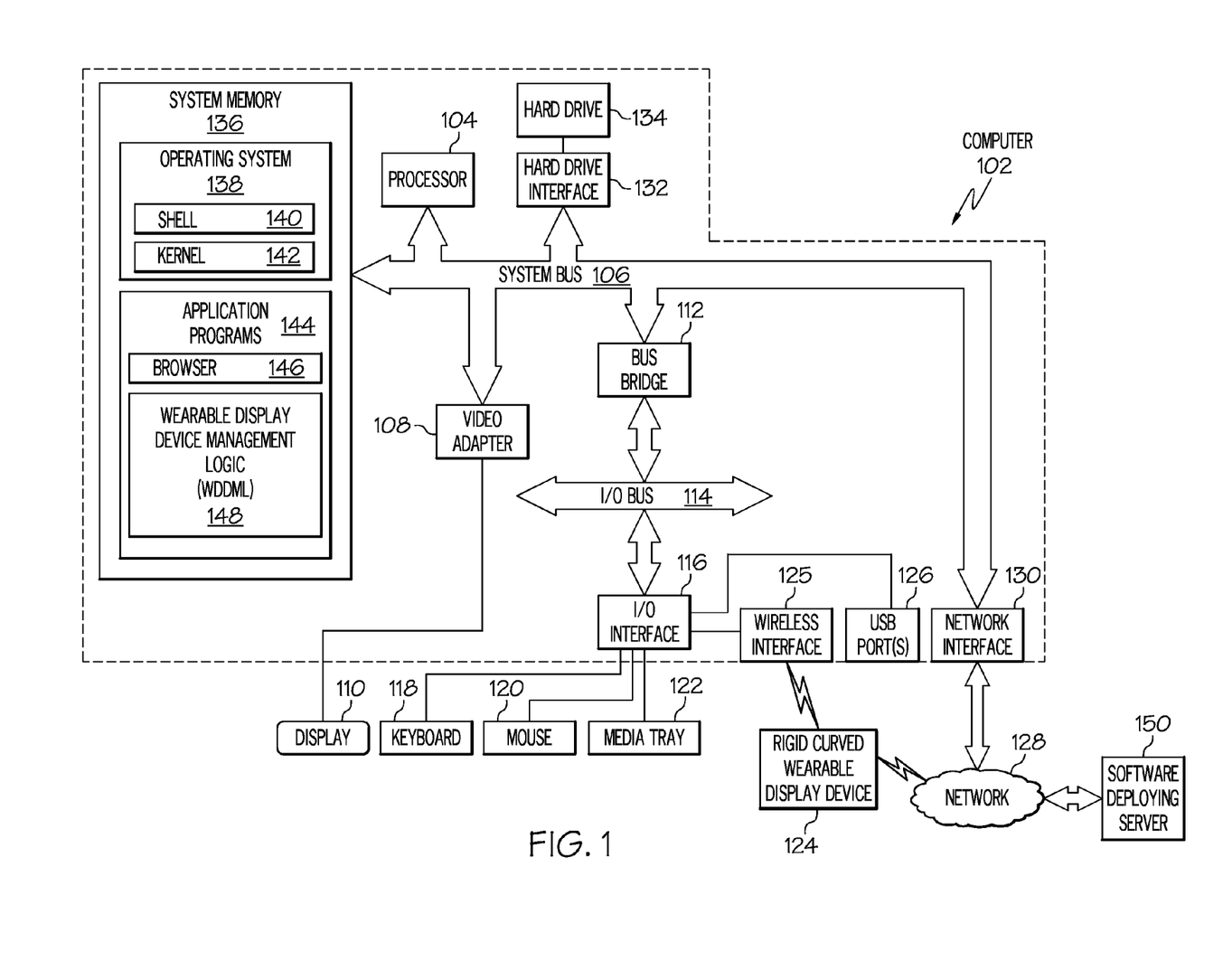
FIG. 1 depicts an exemplary system and network which may be used to implement the present invention.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a rigid curved wearable display device 124.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a rigid curved wearable display device 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

Note that in one embodiment, the rigid curved wearable display device 124 communicates with computer 102 directly via a wireless interface 125, which includes a transceiver capable of sending and receiving radio frequency, infrared, or other wireless transmission carrier signals. In one embodiment, the rigid curved wearable display device 124 communicates with computer 102 via the network 128, assuming that network 128 includes hardware capable of transceiving (transmitting and receiving) radio frequency, infrared, or other wireless transmission carrier signals.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150.

Application programs 144 in computer 102's system memory (as well as software deploying server 150's system memory) also include a wearable display device management logic (WDDML) 148. WDDML 148 includes code for implementing the processes described below, including those described in FIGS. 2-7. In one embodiment, computer 102 is able to download WDDML 148 from software deploying server 150, including in an on-demand basis, wherein the code in WDDML 148 is not downloaded until needed for execution. Note further that, in one embodiment of the present invention, software deploying server 150 performs all of the functions associated with the present invention (including execution of WDDML 148), thus freeing computer 102 from having to use its own internal computing resources to execute WDDML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
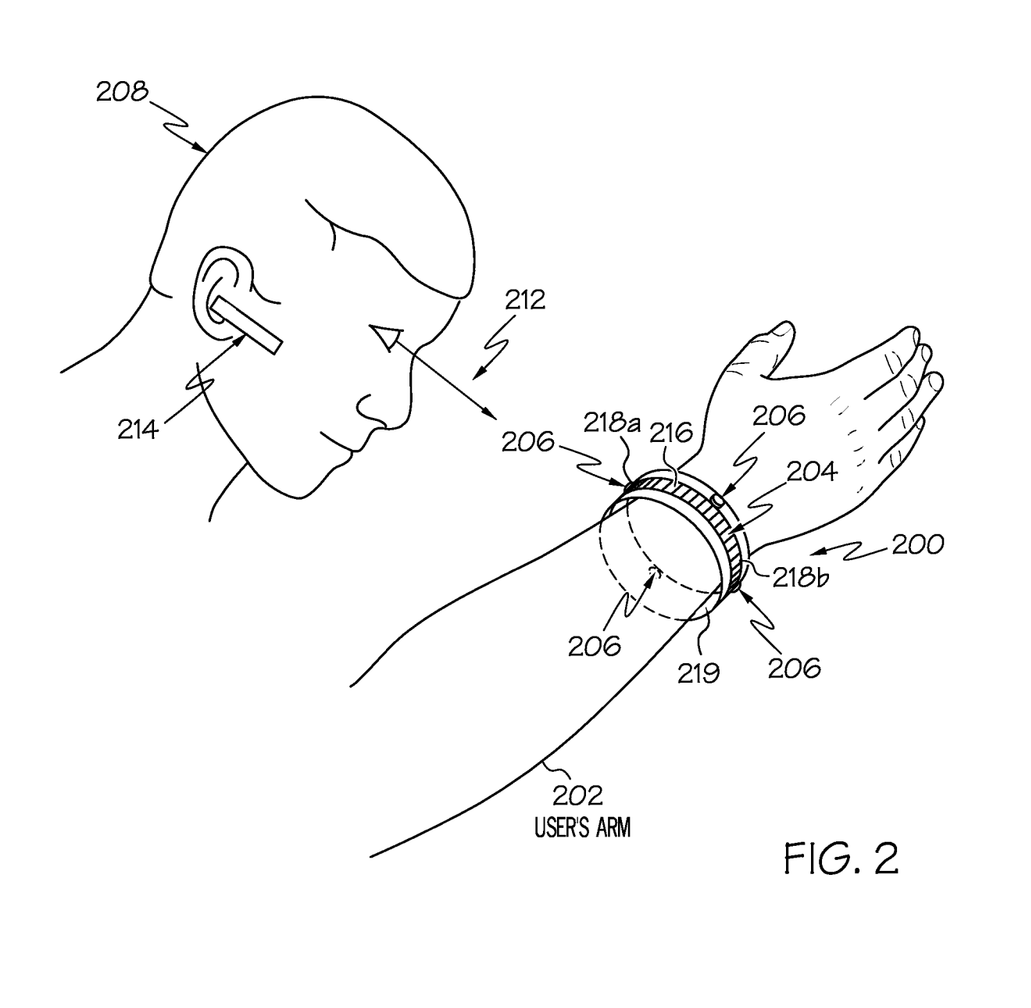
FIG. 2 illustrates an exemplary rigid curved wearable display device on a wearer's arm.

With reference now to FIG. 2, an exemplary rigid curved wearable display device 200 is depicted on a wearer's arm 202. As depicted, the rigid curved wearable display device 200 has an exterior display surface 204. That is, the rigid curved wearable display device 200 has a rigid base (frame) structure 219, on which a flexible display material (i.e., exterior display surface 204) is mounted, thus forming the rigid curved wearable display device 200 shown in FIG. 2. The exterior display surface 204 is composed of a flexible display material, such as an organic light-emitting diode (OLED), a flexible e-paper display, an active matrix light emitting diode (AMOLED) display, etc. All such display materials have a matrix of electroluminescent light emitting material that, analogous to a rigid light emitting diode (LED) or plasma display, is able to selectively illuminate pixel points on the display in order to generate images, including text, photos, videos, etc. While different technologies can be used to manufacturer and/or utilizes such flexible displays, an exemplary technology uses OLED displays, which have a layer of semiconductors (i.e., LEDs), each of which is situated between two electrodes in order to selectively turn each LED off and on.

Mounted on rigid curved wearable display device 200 are multiple sensors 206. As described herein and in various embodiments of the present invention, sensors 206 may be cameras, infrared (IR) sensors, radio frequency (RF) sensors, input buttons, etc. That is, in various embodiments of the present invention sensors 206 are position sensors, cameras, signal receivers, etc. Usages of such sensors 206 are presented in further detail below.

As shown in FIG. 2, the wearer 208 is looking along a field of vision 212 at a central portion 216 of the exterior display surface 204. When looking in the normal (i.e., perpendicular) direction towards the exterior display surface 204 as shown, the image being displayed on the central portion 216 is undistorted, as indicated by the uniformly spaced and parallel lines. However, at the peripheral areas 218a-218b of the exterior display surface 204, the image being displayed is distorted, as indicated by the non-parallel lines that appear to be closer together. That is, the lines in the peripheral areas 218a-218b actually are parallel and spaced apart just as the lines in the central portion 216 are. However, due to the curvature of the rigid curved wearable display device 200 and its exterior display surface 204, the lines in the peripheral areas 218a-218b appear to be closer and non-parallel to the viewer (i.e., wearer 208).

Figure 3A:
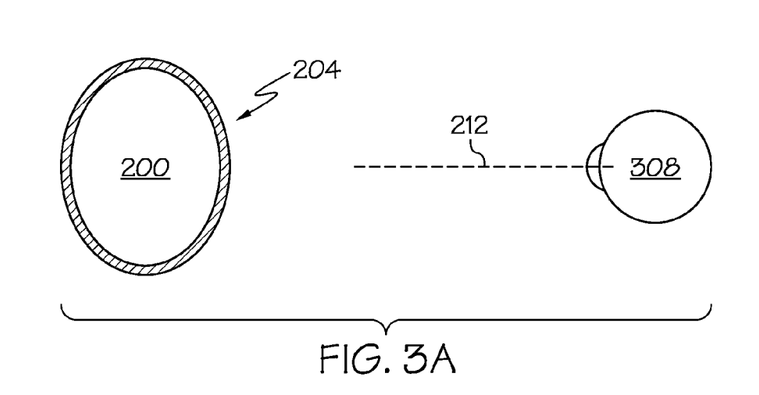
FIGS. 3a-3b depict peripheral distortion of an image caused by a curvature of a display on a rigid curved wearable display device.
Figure 3B:
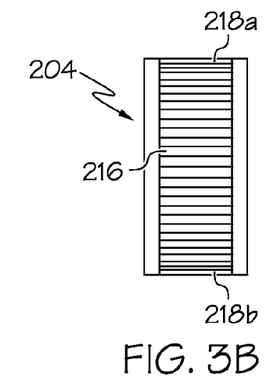

With reference now to FIGS. 3a-3b, the amount of distortion to the image being displayed on the exterior display surface 204 is proportional to the degree of curvature away from a line of sight perpendicular to the display. Thus, FIG. 3a illustrates an edge-on view of this issue. The eyeball 308 represents the wearer's viewpoint of the exterior display surface along the line-of-sight line 212 shown in FIG. 2. FIG. 3b shows what the wearer appears to see. That is, although each of the lines are actually still equidistant and parallel to one another across all of the exterior display surface 204, to the user's eye 308 the lines in the peripheral regions 218a and 218b appear to be closer together (compressed), and possibly no longer parallel (as shown in FIG. 2). This distortion is caused by the curvature of the exterior display surface 204.

Figure 4A:
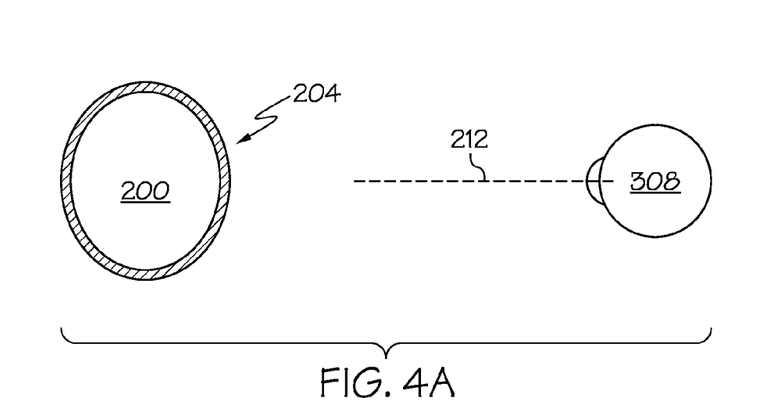
FIGS. 4a-4b illustrate a removal of the peripheral distortion shown in FIG. 3b by modifying the image.
Figure 4B:
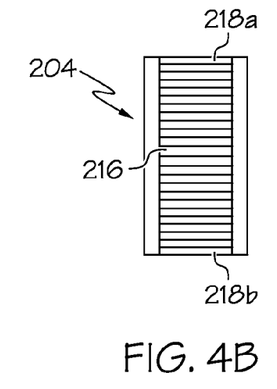
Figure 5:
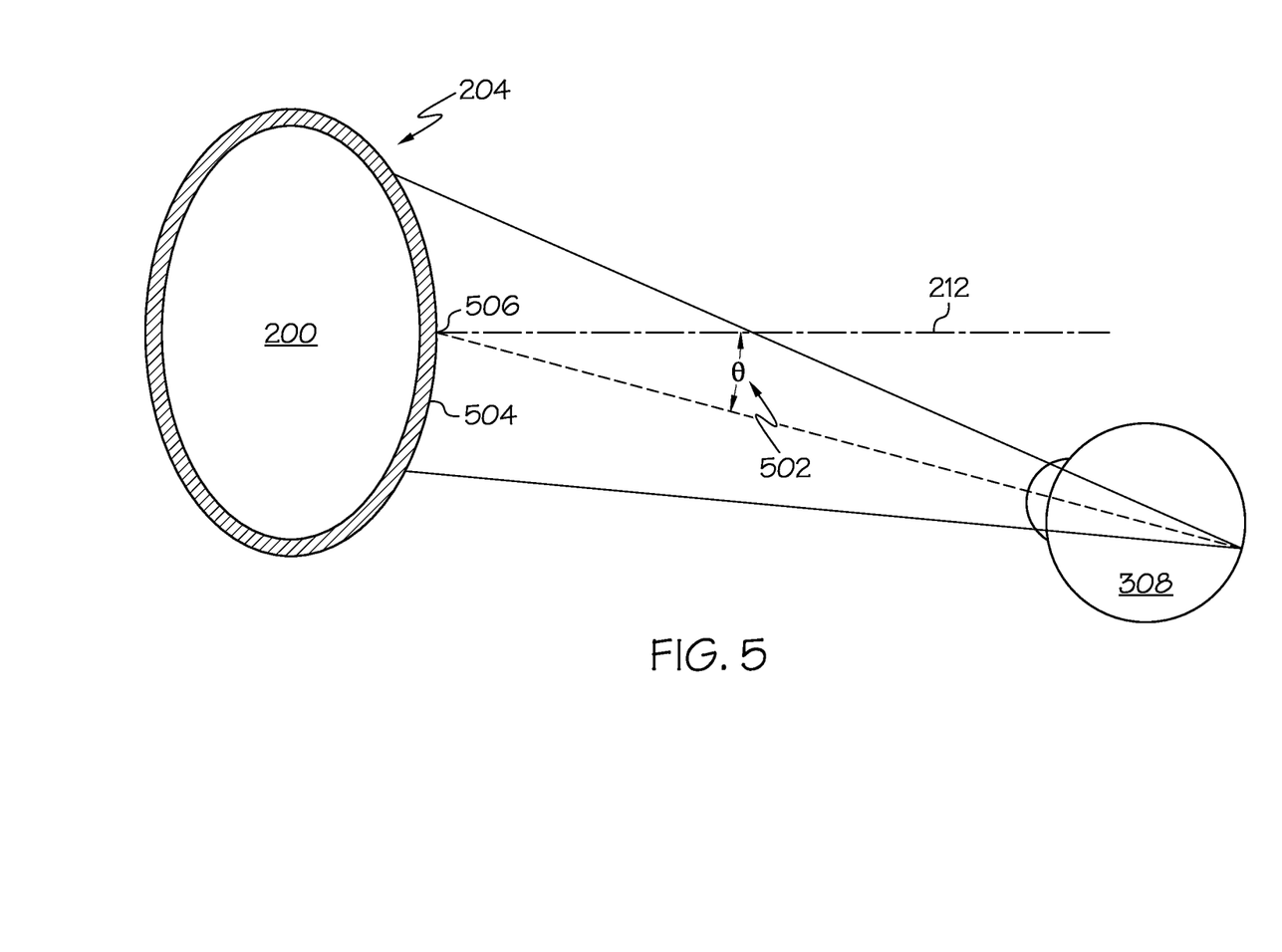
FIG. 5 depicts image distortion caused by viewer parallax.

Consider now FIGS. 4a-4b. The orientation between the user's eye 308 and the exterior display surface 204 is still along the same line-of-sight line 212 shown in FIG. 3a. However, now the lines depicted on the exterior display surface 204 have been moved farther apart from one another (i.e., "stretched") at the peripheral regions 218a and 218b. This causes some of the outer-most lines to no longer be visible to the wearer of the rigid curved wearable display device 200. However, the image no longer appears to be compressed at the peripheral regions 218a and 218b due to the stretching apart of the lines, thus giving the wearer a better (e.g., more "planar") viewing experience. This movement of images/pixels (e.g., the lines shown in the figures) on the exterior display surface 204 is achieved by a stretching transformation computation, which expands/stretches the image at the peripheral regions 218a and 218b based on the amount of curvature in the rigid curved wearable display device 200 and the distance from the user's eye 308 to the exterior display surface 204.

Other aspects of the viewing geometry can impact how the image can be distorted and these may be corrected as well. For example, and with reference now to FIG. 5, the user's eye 308 is still looking at the exterior display surface 204 of the rigid curved wearable display device 200 as shown in FIG. 3. However, now the wearer of the rigid curved wearable display device 200 is no longer viewing the exterior display surface 204 along the line of sight 212 shown in FIG. 3 (such that the wearer's line of sight would be perpendicular to the center of the exterior display surface 204). Rather, in FIG. 5 the wearer is now looking at the exterior display surface 204 at an angle that is offset by angle 502 from the perpendicular line of sight 212. This offset causes the "center" of the exterior display surface 204 (i.e., the portion of the exterior display surface 204 that needs no adjustment to the displayed image) to "shift" to the new area 504. That is, even if the wearer is looking at the original central area 506, the image in central area 506 is now distorted ("compressed") when viewed by the wearer due to the parallax caused by the new viewing angle. As described herein, various sensors (e.g., one or more small cameras on the rigid curved wearable display device 200) can be used to determine this offset angle, such that the image on the exterior display surface 204 is adjusted accordingly, thereby removing peripheral distortion.

Figure 6:
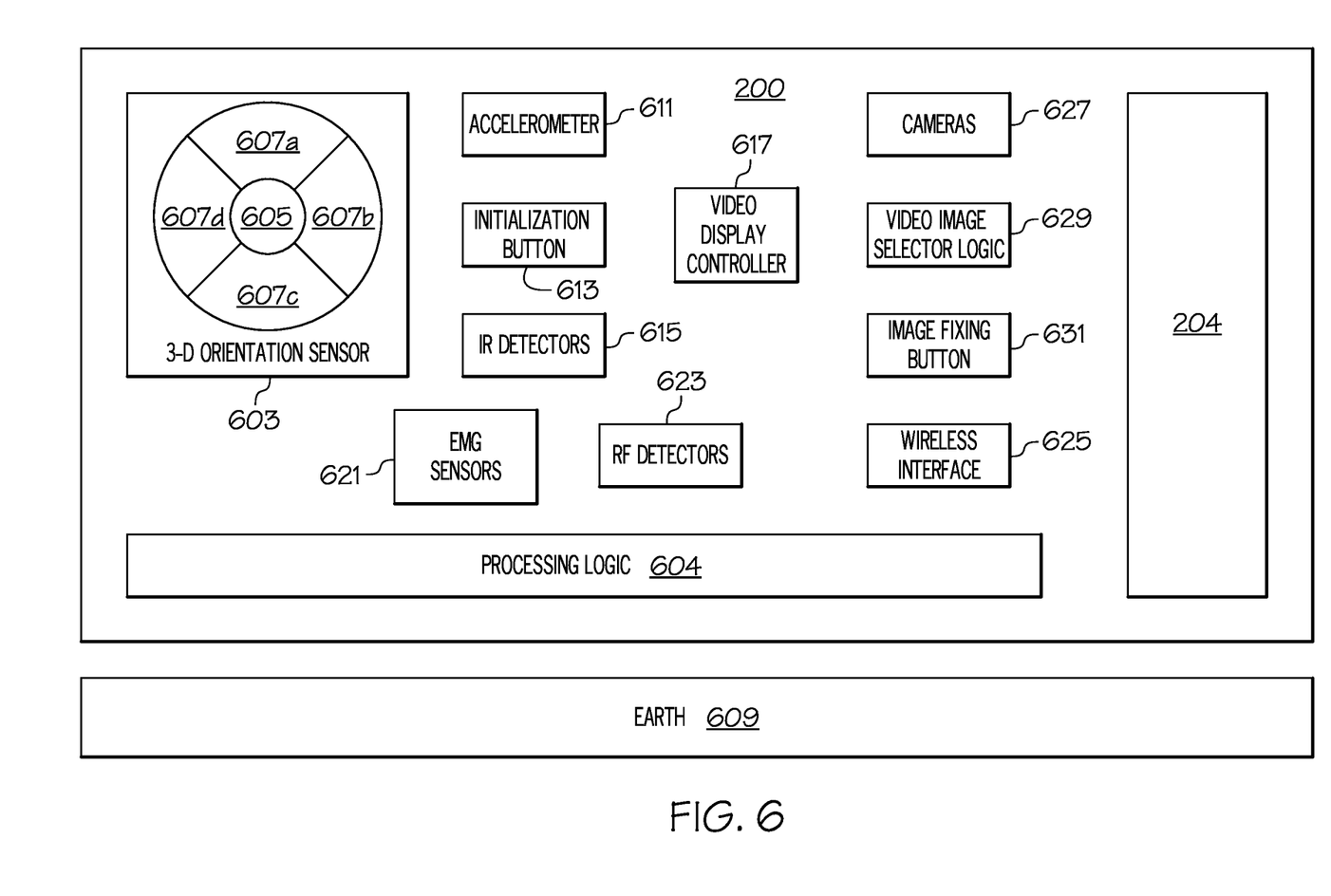
FIG. 6 illustrates various hardware components that are used in one or more embodiments of the rigid curved wearable display device illustrated in FIG. 2.

With reference now to FIG. 6, various hardware components that are used in one or more embodiments of the rigid curved wearable display device 200 illustrated in FIG. 2 are presented. One or more of the hardware components depicted are used to determine the three-dimensional orientation of the rigid curved wearable display device 200, particularly with regard to the spatial relationship between the head and/or eyes of the wearer of the rigid curved wearable display device 200 and the rigid curved wearable display device 200 itself.

As depicted in FIG. 6, in one embodiment the rigid curved wearable display device 200 includes a processing logic 604, which may be a processor, such as processor 104 depicted in FIG. 1. Thus, this embodiment allows the rigid curved wearable display device 200 to function autonomously. In another embodiment, a wireless interface 625 (analogous to the wireless interface 125 depicted in FIG. 1) provides access to a computer (e.g., computer 102 shown in FIG. 1), which analyzes and/or otherwise processes signals from the sensors and other hardware components depicted in FIG. 6.

In one embodiment of the present invention, the position of the rigid curved wearable display device 200 on an arm/wrist of a wearer is determined by a gravity-based three-dimensional (3-D) orientation sensor 603 shown in FIG. 6. The 3-D orientation sensor 603 is a weight-enabled sensor capable of determining the orientation of the rigid curved wearable display device 200. That is, the orientation of the rigid curved wearable display device 200 (in three dimensions) is determined by the position of the arm/wrist of the wearer (e.g., wearer's arm 202 shown in FIG. 2). For example, the wearer's arm may be hanging down, in front of the wearer, above the wearer, with the elbow and/or wrist straight or crooked, etc. Such arm/elbow/wrist positioning results in the rigid curved wearable display device 200 being positioned in a specific orientation, which is identified by the 3-D orientation sensor 603.

For example, assume that the 3-D orientation sensor has a centroid ball 605. Assume further that surrounding the centroid ball 605 is a pressure detecting material, such as piezoelectric crystals, depicted as regions 607a-607d. When the rigid curved wearable display device 200 is positioned as shown relative to the Earth 609, then gravity pulls the centroid ball 605 against region 607c of the pressure detecting material. If the rigid curved wearable display device 200 were to be inverted, then the centroid ball 605 would be pulled against region 607a of the pressure detecting material. If the rigid curved wearable display device 200 were to be rotated 90-degrees, then the centroid ball 605 would be pulled against either region 607b or 607d of the pressure detecting material. Similarly, if rigid curved wearable display device 200 were to be partially rotated (i.e., less than a full 90 degrees or 180 degrees), then the centroid ball 605 would be pulled against proportional amounts of the regions 607, thus presenting a full 360 degree resolution of the orientation of the rigid curved wearable display device 200.

Assume further that the pressure detecting material surrounding the centroid ball 605 in 3-D orientation sensor 603 surrounds the centroid ball in all three axes (X, Y, Z). This spherical surrounding of pressure detecting material around the centroid ball 605 thus identifies a full 3-D directional orientation of the rigid curved wearable display device 200.

While the depiction of 3-D orientation sensor 603 provides one enabling embodiment of the present invention, other embodiments may use spring gauges supporting a centroid weight, accelerometers, etc.

In any configuration of the 3-D orientation sensor 603, a correlation is made between the 3-D orientation sensor 603 and the position of the wearer's arm/wrist. For example, assume that a wearer has his arm hanging straight down, and that the rigid curved wearable display device 200 is on his/her wrist. Whenever the wearer's arm hangs straight down, the centroid ball 605 is known to push down on region 607c of the pressure detecting material shown in 3-D orientation sensor 603. Similarly, whenever the wearer's arm is straight up, the centroid ball 605 is known to push down on region 607a of the pressure detecting material shown in 3-D orientation sensor 603. Similarly, when the wearer's arm is extended away from the front of his body, while bending the elbow at 45 degrees, then the centroid ball 605 is known to push against a specific combination of regions 607d and 607c of the pressure detecting material. By comparing current readings from 3-D orientation sensor 603 with known readings, the physical orientation of the rigid curved wearable display device 200 can be determined. That is, previous readings from the 3-D orientation sensor 603 generated while the wearer's arm was hanging straight down generated a specific set of outputs from one or more of the regions of pressure detecting material surrounding the centroid ball 605. Thus, if the centroid ball 605 is pressing against the pressure detecting material in region 607c, then a determination is made that the wearer's arm is hanging straight down by his/her side, assuming that the wearer is wearing the rigid curved wearable display device 200 on his/her wrist. Similarly, other known positions/readings are compared with the current readings from the 3-D orientation sensor 603, in order to identify the current position of the rigid curved wearable display device 200 according to the position of the wearer's arm, elbow, wrist, etc. Again, it is to be understood that the regions surrounding the centroid ball 605 are actually three-dimensional regions (rather than the two-dimensional cross section shown in FIG. 6), thereby describing a full 3-D orientation (i.e., along the X, Y, Z Cartesian axes) of the rigid curved wearable display device 200.

In one embodiment of the present invention, the position of the rigid curved wearable display device 200 on an arm/wrist of a wearer is determined by an accelerometer 611 shown in FIG. 6. Accelerometer 611 is any electromechanical device capable of detecting movement, in any 3-D axis, of the rigid curved wearable display device 200. By identifying an initial starting position in 3-D space of the rigid curved wearable display device 200 (by manual settings or through use of other components within the rigid curved wearable display device 200), the current real-time position of the rigid curved wearable display device 200 can be determined by processing logic 604. For example, assume that the wearer inputs (using an initialization button 613) a signal indicating that the wearer's arm (on the wrist of which the rigid curved wearable display device 200 is being worn)

is hanging straight down. Thereafter, any movement, in any 3-D space, is detected by the accelerometer 611. These changes are then processed by the processing logic 604, which calculates/determines exactly where the rigid curved wearable display device 200 is in relation to the wearer's eyes/head. This tells the video display controller 617 where content displayed on exterior display surface 204 should be modified in order to avoid visual distortion (e.g., in peripheral areas 218a-218b).

In one embodiment of the present invention, the position of the rigid curved wearable display device 200 relative to the wearer's head is determined by infrared (IR) sensors, such as IR detectors 615 depicted in FIG. 6. That is, assume that multiple IR sensors are positioned about the exterior of the rigid curved wearable display device 200. Assume further that the wearer's head emits the greatest amount of heat from his body, since other areas have less blood flow near the skin surface, the face has the greatest density of capillaries near the epidermis, the face is the only part of the body that is usually uncovered by clothing, etc. Thus, one of the IR detectors 615 detects a highest level of IR radiation (heat). The position of that IR detector 615 is thus determined to be facing the wearer's face (and thus his eyes). This tells the video display controller 617 where content displayed on exterior display surface 204 should be modified in order to avoid visual distortion (e.g., in peripheral areas 218a-218b).

Thus, the present device determines whether or not the wearer can see the exterior display surface 204 on the rigid curved wearable display device 200, which region of the exterior display surface 204 is perpendicular to the eye of the wearer, and which region(s) are in peripheral areas of the exterior display surface 204. This is performed by a continuous monitoring of visual inputs (images) of the wearer's face by the multiple sensors/cameras.

In one embodiment of the present invention, the position of the rigid curved wearable display device 200 relative to the wearer's head is determined by electromyographic (EMG) sensors 621 shown in FIG. 6. EMG sensors 621 are sensors that detect muscular movements by the wearer. That is, whenever a person moves a muscle, an electrical signal (i.e., an ion-induced change in electrical potential across the nerve membrane) is transmitted down axons (nerve fibers) that control the muscles. A motor neuron and the muscles that it innervates are collectively known as a motor unit. When the motor neuron causes the muscles in the motor unit to contract, electrical activity is stimulated in these muscles. The sum of the electrical activity from the motor neuron and the muscles in the motor unit create a motor unit action potential (MUAP), which is measured by the EMG sensors 621. The measured MUAP is analyzed by the processing logic 604 to identify the level of muscle movement. That is, electrical signals are specific enough to identify a location of which muscles are being moved. Whenever the wearer moves his arm/elbow/wrist, a unique MUAP pattern occurs. Thus, the MUAP pattern detected in real time by the EMG sensors 621 is compared with known/stored MUAP readings for specific arm/elbow/wrist positions. This comparison leads to a determination of where the rigid curved wearable display device 200 is in relation to the wearer's face (and thus his eyes). This tells the video display controller 617 where content displayed on exterior display surface 204 should be modified in order to avoid visual distortion (e.g., in peripheral areas 218a-218b).

In one embodiment of the present invention, the position of the rigid curved wearable display device 200 relative to the wearer's head is determined by radio frequency (RF) detectors 623, which detect the location and strength of RF signals coming from the wearer's head. For example and returning again to FIG. 2, assume that the wearer 208 has an RF transmitter 214 near or affixed to his head. This RF transmitter may be part of a cell phone that he is holding to his head, or part of a set of "smart glasses" that have electronic capabilities. The RF transmitter 214 transmits a beam to the RF detectors 623 on the rigid curved wearable display device 200. The RF detectors 623 are positioned across various positions on the rigid curved wearable display device 200, such that the RF beam reaches the different RF detectors 623 at different times. These time differences (determined in one embodiment by identifying phase shifts that occur as a same signal reaches different RF detectors 623 at different times) allow the processing logic 604 to calculate where the rigid curved wearable display device 200 is in relation to the wearer's face (and thus his eyes). This tells the video display controller 617 where content displayed on exterior display surface 204 should be modified in order to avoid visual distortion (e.g., in peripheral areas 218a-218b).

Thus, as described herein, in one embodiment of the present invention, a rigid curved wearable display device includes a set of position sensors (e.g., accelerometer 611, IR detectors 615, EMG sensors 621, cameras 627 shown in FIG. 6), one or more processors (e.g., processing logic 604 in FIG. 6), and a video display controller (e.g., video display controller 617 shown in FIG. 6. The set of position sensors provide positioning data that describe, in real time, a physical three-dimensional orientation of the rigid curved wearable display device relative to a field of vision of a wearer of the rigid curved wearable display device. The rigid curved wearable display device has an exterior display surface (e.g., exterior display surface 204 shown in FIG. 2). The exterior display surface has a convex planar shape (i.e., has a flat surface that is shaped/bent to create a surface that is curved like the exterior of a circle or sphere). The position sensors determine a present viewable area of the exterior display surface (i.e., what the wearer presently is able to see) based on the physical three-dimensional orientation of the rigid curved wearable display device relative to the field of vision of the wearer of the rigid curved wearable display device.

The one or more processors modify an image on the present viewable area based on the physical three-dimensional orientation of the rigid curved wearable display device relative to the field of vision of the wearer of the rigid curved wearable display device, thus generating a modified image.

The video display controller then displays the modified image on a predefined area of the exterior display surface.

In one embodiment of the present invention, the predefined area of the exterior display surface is all of the present viewable area of the exterior display surface (e.g. central portion 216 and peripheral areas 218a-218b of the exterior display surface 204 shown in FIG. 2). The processors thus apply stretching transformations to the image to generate the modified image, where the stretching transformations remove peripheral distortions to the image caused by the convex planar shape of the exterior display surface. These stretching transformations stretch the image being displayed on the exterior display surface based on 1) the image, 2) the field of vision of the wearer, and 3) the shape of the exterior display surface. By knowing the field of vision of the wearer (relative to the exterior display surface) and the shape of the exterior display surface, the system overcomes the perceived compression (distortion) of the image at the peripheral areas by artificially stretching out (imposing additional spatial regions) to these peripheral areas of the exterior display surface.

In one embodiment of the present invention, the original image and the modified image are visually a same image. That is, the original image is able to fit on the central portion of the presently viewable area of the exterior display surface, such that there is no distortion of the original image when displayed in the central portion of the exterior display surface, and thus the original image is displayed (unmodified) in this central portion.

In one embodiment of the present invention, multiple cameras (shown as sensors 206 in FIG. 2) are positioned on different locations on the rigid curved wearable display device (as also shown in FIG. 2). These cameras capture different photos of the wearer, such that each photo shows a different perspective of the user's face. For example, one photo may show the user's right ear as being larger than the user's left ear (due to object perspective in which a closer object looks larger than a farther object), thus indicating that the photo is being taken from the right side. Such images, either alone or in combination thus provide enough information to the processors to determine the physical three-dimensional orientation of the rigid curved wearable display device relative to a field of vision of a wearer of the rigid curved wearable display device.

In one embodiment of the present invention, an array of infrared detectors (e.g., IR detectors 615 in FIG. 6) is located on the rigid curved wearable display device. These infrared detectors provide information used to determine which area of the exterior display surface is closest to the wearer/viewer, and thus can be used to identify the central area of the exterior display surface. Thus, a video display controller (e.g., video display controller 617 in FIG. 6) identifies which of the infrared detectors is detecting a highest level of infrared radiation as compared with other infrared detectors from the array of infrared detectors, and then determines a location of a face of a wearer as being in a direction that an infrared detector that is detecting a highest level of infrared radiation is facing. That is, an IR detector that is farther away from the user's face will detect less heat from the user's face than a closer IR detector, thus enabling the video display controller to determine the relative position of the user's face to the exterior display surface. The video display controller then displays the image on the predefined area of the exterior display surface that faces the wearer.

In one embodiment of the present invention, electromyogram sensors (e.g., EMG sensors 621 shown in FIG. 6) detect muscular activity within the arm of the wearer in real time. That is, as the user/wearer moves muscles in his/her arm/hands, EMG electrical activity associated with such muscle movement is detected by the EMG sensors, thus allowing the system (e.g., processing logic 604 and/or video display controller 617 in FIG. 6) to determine the location and orientation of the rigid curved wearable display device relative to the user/wearer's face. The video display controller then displays the image on the predefined area of the exterior display surface that faces the wearer, as determined by the location and orientation of the rigid curved wearable display device relative to the user/wearer's face.

Figure 7:
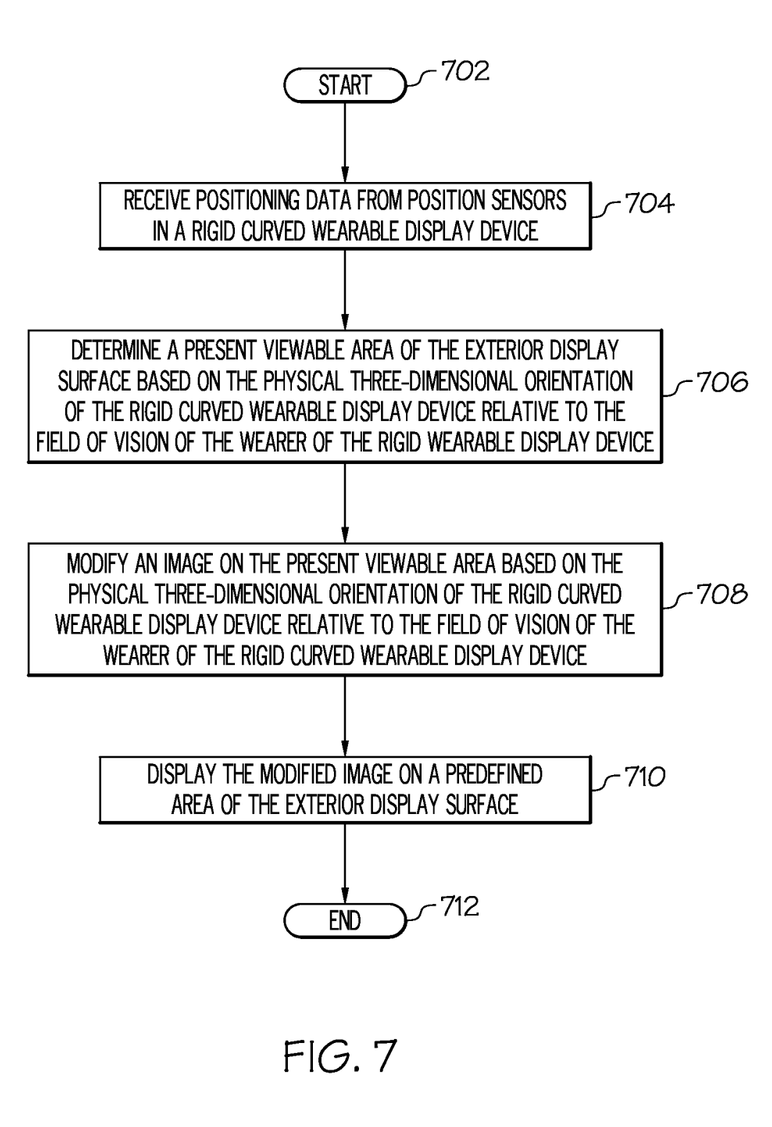
FIG. 7 is a high level flow chart of one or more exemplary steps taken by one or more processors to manage a rigid curved wearable display device.

With reference now to FIG. 7, a high level flow chart of one or more exemplary steps taken by one or more processors to manage a rigid curved wearable display device is presented. After initiator block 702, positioning data is received from position sensors in a rigid curved wearable display device (block 704). These position sensors provide positioning data that describe a physical three-dimensional orientation of the rigid curved wearable display device in real time. As described herein, the rigid curved wearable display device has an exterior display surface, which has a convex planar shape. Note that the positioning data from the position sensors (e.g., 3-D orientation sensor 603, accelerometer 611, IR detectors 615, EMG sensors 621, RF detectors 623 shown in FIG. 6) can be received locally by a processing logic (e.g., the processing logic 604 shown in FIG. 6) or remotely (e.g., a computer 102 shown in FIG. 1).

Returning to FIG. 6, the position sensors determine a present viewable area of the exterior display surface based on the physical three-dimensional orientation of the rigid curved wearable display device relative to the field of vision of the wearer of the rigid curved wearable display device, as described in block 706.

As described in block 708, one or more processors then modify an image on the present viewable area based on the physical three-dimensional orientation of the rigid curved wearable display device relative to the field of vision of the wearer of the rigid curved wearable display device, thus generating a modified image.

As described in block 710, a video display controller then displays the modified image on a predefined area of the exterior display surface.

The flow-chart ends at terminator block 712.

In one embodiment of the present invention, the predefined area of the exterior display surface is all of the present viewable area of the exterior display surface (e.g., central area 216 as well as peripheral areas 218a-218b in FIG. 2). In this embodiment, one or more processors apply stretching transformations to the image to generate the modified image. As described herein, the stretching transformations remove peripheral distortions to the image caused by the convex planar shape of the exterior display surface.

In one embodiment of the present invention, the original image and the modified image are visually a same image. That is, there is no modification (stretching, compressing, etc.) of the image. In this embodiment, the predefined area of the exterior display surface is a central portion of the present viewable area of the exterior display surface. The central portion is centered within the field of vision of the wearer of the rigid curved wearable display device, and the convex planar shape of the exterior display surface causes no distortion to the original image when displayed in the central portion of the exterior display surface. Thus, no modification to the image is required.

As described herein and in one embodiment of the present invention, determining the positioning data that describe the physical three-dimensional orientation of the rigid curved wearable display device is achieved by receiving, by one or more processors, radio frequency (RF) readings from an array of RF detectors within the rigid curved wearable display device. The RF detectors detect a relative location and distance of an RF transmitter that is positioned on a head of the wearer. Processors then determine a location of a face of the wearer based on the RF readings that are received by the array of RF detectors from the RF transmitter on the head of the wearer, and the image is displayed on the predefined area of the exterior display surface that is facing the face of the wearer.

As described herein and in one or more embodiments of the present invention, processors receive positioning data that describe the physical three-dimensional orientation of the rigid curved wearable display device from an accelerometer within the rigid curved wearable display device.

As described herein and in one embodiment of the present invention, determining the positioning data that describe the physical three-dimensional orientation of the rigid curved wearable display device is achieved by one or more processors receiving infrared readings from an array of infrared detectors within the rigid curved wearable display device. The processors identify which of the infrared detectors is detecting a highest level of infrared radiation as compared with other infrared detectors from the array of infrared detectors, and then determine a location of a face of the wearer as being in a direction of an infrared detector that is detecting the highest level of infrared radiation is facing. The video display controller then displays the image on the predefined area of the exterior display surface that faces the face of the wearer.

As described herein and in one embodiment of the present invention, determining the positioning data that describe the physical three-dimensional orientation of the rigid curved wearable display device is achieved by one or more processors receiving positioning readings from a three-dimension orientation sensor within the rigid curved wearable display device, where the three-dimension orientation sensor detects gravitational forces from Earth to describe a three-dimensional orientation of the rigid curved wearable display device in real time. Processors then determine, based on detected Earth gravitational forces, a location and orientation of the rigid curved wearable display device with relation to a face of the wearer. The video display controller then displays the image on the predefined area of the exterior display surface that faces the face of the wearer.

As described herein and in one embodiment of the present invention, determining the positioning data that describe the physical three-dimensional orientation of the flexible output device is achieved by one or more processors receiving electromyographic readings from electromyogram sensors within the rigid curved wearable display device, where the electromyogram sensors detect muscular activity within the arm of the wearer in real time. The processors then determine, based on the electromyographic readings, a location and orientation of the rigid curved wearable display device with relation to a face of the wearer. The video display controller then displays the video content on the predefined area of the exterior display surface that faces the wearer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described embodiments of the invention of the present application in detail and by reference to illustrative embodiments thereof, it will be apparent that modifications and variations are possible without departing from the scope of the invention defined in the appended claims.

What is claimed is:

1. A method of displaying an image on a rigid curved wearable display device, the method comprising:

receiving, by one or more processors, positioning data from position sensors on a rigid curved wearable display device, wherein the position sensors provide positioning data that describe, in real time, a physical three-dimensional orientation of the rigid curved wearable display device relative to a field of vision of a wearer of the rigid curved wearable display device, wherein the rigid curved wearable display device comprises an exterior display surface, and wherein the exterior display surface has a convex planar shape;

determining the positioning data that describe the physical three-dimensional orientation of the rigid curved wearable display device relative to the field of vision of the wearer of the rigid curved wearable display device by:

receiving, by one or more processors, radio frequency (RF) readings from an array of RF detectors within the rigid curved wearable display device, wherein the RF detectors detect a relative location and distance of an RF transmitter that is positioned on a head of the wearer, and determining, by one or more processors, a location of a face of the wearer based on the RF readings that are received by the array of RF detectors from the RF transmitter on the head of the wearer;

further determining the positioning data that describe the physical three-dimensional orientation of the rigid curved wearable display device relative to the field of vision of the wearer of the rigid curved wearable display device by:

receiving, by one or more processors, infrared readings from an array of infrared detectors within the rigid curved wearable display device, identifying, by one or more processors, which of the infrared detectors is detecting a highest level of infrared radiation as compared with other infrared detectors from the array of infrared detectors, further determining, by one or more processors, the location of the face of the wearer as being in a direction that an infrared detector, which is detecting the highest level of infrared radiation, is facing;

further determining the positioning data that describe the physical three-dimensional orientation of the rigid curved wearable display device relative to the field of vision of the wearer of the rigid curved wearable display device by:

receiving, by one or more processors, positioning readings from a three-dimension orientation sensor within the rigid curved wearable display device, wherein the three-dimension orientation sensor detects gravitational forces from Earth to describe a three-dimensional orientation of the rigid curved wearable display device in real time, wherein the three-dimension orientation sensor comprises a centroid ball and pressure detecting material, wherein the pressure detecting material surrounds the centroid ball, wherein the pressure detecting material is made of piezoelectric crystals, and wherein the centroid ball is pulled by gravity against the piezoelectric crystals to identify the three-dimensional orientation of the rigid curved wearable display device in real time, and determining, by one or more processors and based on detected Earth gravitational forces, a location and orientation of the rigid curved wearable display device with relation to the face of the wearer;

further determining the positioning data that describe the physical three-dimensional orientation of the flexible output device relative to the field of vision of the wearer of the rigid curved wearable display device by:

receiving, by one or more processors, electromyographic readings from electromyogram sensors within the rigid curved wearable display device, wherein the electromyogram sensors detect muscular activity within the arm of the wearer in real time, and further determining, by one or more processors and based on the electromyographic readings, the location and orientation of the rigid curved wearable display device with relation to the face of the wearer;

determining, by the position sensors, a present viewable area of the exterior display surface based on the physical three-dimensional orientation of the rigid curved wearable display device relative to the field of vision of the wearer of the rigid curved wearable display device;

modifying, by one or more processors, an image on the present viewable area based on the physical three-dimensional orientation of the rigid curved wearable display device relative to the field of vision of the wearer of the rigid curved wearable display device, wherein modifying the image generates a modified image; and displaying, by a video display controller, the modified image on a predefined area of the exterior display surface.

2. The method of claim 1, wherein the predefined area of the exterior display surface is all of the present viewable area of the exterior display surface, and wherein the method further comprises:

applying, by one or more processors, stretching transformations to the image to generate the modified image, wherein the stretching transformations remove peripheral distortions to the image caused by the convex planar shape of the exterior display surface.

3. The method of claim 1, wherein the original image and the modified image are visually a same image, wherein the predefined area of the exterior display surface is a central portion of the present viewable area of the exterior display surface, wherein the central portion is centered within the field of vision of the wearer of the rigid curved wearable display device, and wherein the convex planar shape of the exterior display surface causes no distortion to the original image when displayed in the central portion of the exterior display surface.

4. The method of claim 1, further comprising:

receiving, by one or more processors, positioning data that describe the physical three-dimensional orientation of the rigid curved wearable display device from an accelerometer within the rigid curved wearable display device.

5. A rigid curved wearable display device, comprising:

a set of position sensors, wherein the set of position sensors provide positioning data that describe, in real time, a physical three-dimensional orientation of the rigid curved wearable display device relative to a field of vision of a wearer of the rigid curved wearable display device, wherein the rigid curved wearable display device comprises an exterior display surface, wherein the exterior display surface has a convex planar shape, and wherein the position sensors determine a present viewable area of the exterior display surface based on the physical three-dimensional orientation of the rigid curved wearable display device relative to the field of vision of the wearer of the rigid curved wearable display device;

one or more processors that determine the positioning data that describe the physical three-dimensional orientation of the rigid curved wearable display device relative to the field of vision of the wearer of the rigid curved wearable display device by:

receiving radio frequency (RF) readings from an array of RF detectors within the rigid curved wearable display device, wherein the RF detectors detect a relative location and distance of an RF transmitter that is positioned on a head of the wearer, and determining a location of a face of the wearer based on the RF readings that are received by the array of RF detectors from the RF transmitter on the head of the wearer;

receiving infrared readings from an array of infrared detectors within the rigid curved wearable display device, identifying which of the infrared detectors is detecting a highest level of infrared radiation as compared with other infrared detectors from the array of infrared detectors, and further determining the location of the face of the wearer as being in a direction that an infrared detector, which is detecting the highest level of infrared radiation, is facing;

receiving positioning readings from a three-dimension orientation sensor within the rigid curved wearable display device, wherein the three-dimension orientation sensor detects gravitational forces from Earth to describe a three-dimensional orientation of the rigid curved wearable display device in real time, wherein the three-dimension orientation sensor comprises a centroid ball and pressure detecting material, wherein the pressure detecting material surrounds the centroid ball, wherein the pressure detecting material is made of piezoelectric crystals, and wherein the centroid ball is pulled by gravity against the piezoelectric crystals to identify the three-dimensional orientation of the rigid curved wearable display device in real time, and determining, based on detected Earth gravitational forces, a location and orientation of the rigid curved wearable display device with relation to the face of the wearer;

receiving electromyographic readings from electromyogram sensors within the rigid curved wearable display device, wherein the electromyogram sensors detect muscular activity within the arm of the wearer in real time, and further determining, based on the electromyographic readings, the location and orientation of the rigid curved wearable display device with relation to a face of the wearer;

one or more processors that modify an image on the present viewable area based on the physical three-dimensional orientation of the rigid curved wearable display device relative to the field of vision of the wearer of the rigid curved wearable display device, wherein modifying the image generates a modified image; and a video display controller that displays the modified image on a predefined area of the exterior display surface.

6. The rigid curved wearable display device of claim 5, wherein the predefined area of the exterior display surface is all of the present viewable area of the exterior display surface, and wherein the one or more processors apply stretching transformations to the image to generate the modified image, wherein the stretching transformations remove peripheral distortions to the image caused by the convex planar shape of the exterior display surface.

7. The rigid curved wearable display device of claim 5, wherein the original image and the modified image are visually a same image, wherein the predefined area of the exterior display surface is a central portion of the present viewable area of the exterior display surface, wherein the central portion is centered within the field of vision of the wearer of the rigid curved wearable display device, and wherein the convex planar shape of the exterior display surface causes no distortion to the original image when displayed in the central portion of the exterior display surface.

8. The rigid curved wearable display device of claim 5, further comprising:

multiple cameras positioned on different locations on the rigid curved wearable display device, wherein the multiple cameras capture different photos of the wearer, and wherein one or more processors determine the physical three-dimensional orientation of the rigid curved wearable display device relative to a field of vision of a wearer of the rigid curved wearable display device based on the different photos of the wearer.

9. A computer program product for displaying an image on a rigid curved wearable display device, the computer program product comprising a non-transitory computer readable storage medium having program code embodied therewith, wherein the program code is readable and executable by a processor to perform a method comprising:

receiving positioning data from position sensors on a rigid curved wearable display device, wherein the position sensors provide positioning data that describe, in real time, a physical three-dimensional orientation of the rigid curved wearable display device relative to a field of vision of a wearer of the rigid curved wearable display device, wherein the rigid curved wearable display device comprises an exterior display surface, and wherein the exterior display surface has a convex planar shape;

determining the positioning data that describe the physical three-dimensional orientation of the rigid curved wearable display device relative to the field of vision of the wearer of the rigid curved wearable display device by:

receiving radio frequency (RF) readings from an array of RF detectors within the rigid curved wearable display device, wherein the RF detectors detect a relative location and distance of an RF transmitter that is positioned on a head of the wearer, and determining a location of a face of the wearer based on the RF readings that are received by the array of RF detectors from the RF transmitter on the head of the wearer;

further determining the positioning data that describe the physical three-dimensional orientation of the rigid curved wearable display device relative to the field of vision of the wearer of the rigid curved wearable display device by:

receiving infrared readings from an array of infrared detectors within the rigid curved wearable display device, identifying which of the infrared detectors is detecting a highest level of infrared radiation as compared with other infrared detectors from the array of infrared detectors, further determining the location of the face of the wearer as being in a direction that an infrared detector, which is detecting the highest level of infrared radiation, is facing;

further determining the positioning data that describe the physical three-dimensional orientation of the rigid curved wearable display device relative to the field of vision of the wearer of the rigid curved wearable display device by:

receiving positioning readings from a three-dimension orientation sensor within the rigid curved wearable display device, wherein the three-dimension orientation sensor detects gravitational forces from Earth to describe a three-dimensional orientation of the rigid curved wearable display device in real time, wherein the three-dimension orientation sensor comprises a centroid ball and pressure detecting material, wherein the pressure detecting material surrounds the centroid ball, wherein the pressure detecting material is made of piezoelectric crystals, and wherein the centroid ball is pulled by gravity against the piezoelectric crystals to identify the three-dimensional orientation of the rigid curved wearable display device in real time, and determining, based on detected Earth gravitational forces, a location and orientation of the rigid curved wearable display device with relation to the face of the wearer;

further determining the positioning data that describe the physical three-dimensional orientation of the flexible output device relative to the field of vision of the wearer of the rigid curved wearable display device by:

receiving electromyographic readings from electromyogram sensors within the rigid curved wearable display device, wherein the electromyogram sensors detect muscular activity within the arm of the wearer in real time, and further determining, based on the electromyographic readings, the location and orientation of the rigid curved wearable display device with relation to the face of the wearer;

determining, by data received from the position sensors, a present viewable area of the exterior display surface based on the physical three-dimensional orientation of the rigid curved wearable display device relative to the field of vision of the wearer of the rigid curved wearable display device;

modifying an image on the present viewable area based on the physical three-dimensional orientation of the rigid curved wearable display device relative to the field of vision of the wearer of the rigid curved wearable display device, wherein modifying the image generates a modified image; and displaying, by a video display controller, the modified image on a predefined area of the exterior display surface.

10. The computer program product of claim 9, wherein the predefined area of the exterior display surface is all of the present viewable area of the exterior display surface, and wherein the method further comprises:

applying, by one or more processors, stretching transformations to the image to generate the modified image, wherein the stretching transformations remove peripheral distortions to the image caused by the convex planar shape of the exterior display surface.

11. The computer program product of claim 9, wherein the original image and the modified image are visually a same image, wherein the predefined area of the exterior display surface is a central portion of the present viewable area of the exterior display surface, wherein the central portion is centered within the field of vision of the wearer of the rigid curved wearable display device, and wherein the convex planar shape of the exterior display surface causes no distortion to the original image when displayed in the central portion of the exterior display surface.

* * * * *